July 17, 1956  A. V. KLANCNIK  2,755,112
FITTINGS
Filed July 6, 1953  2 Sheets-Sheet 1
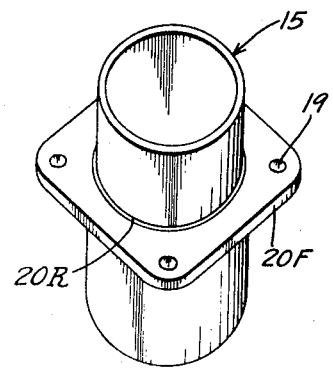
FIG. 1
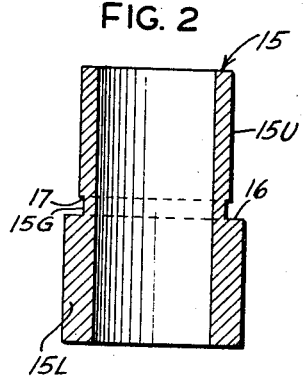
FIG. 2
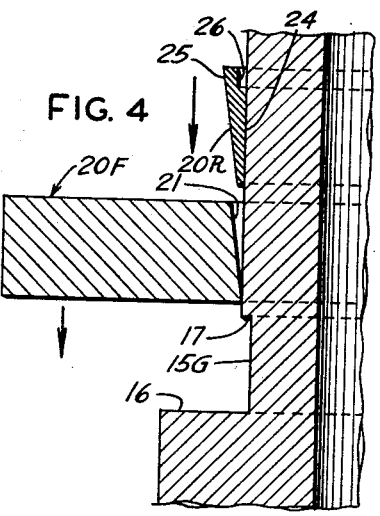
FIG. 4
FIG. 4A
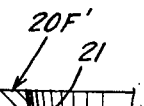
FIG. 6
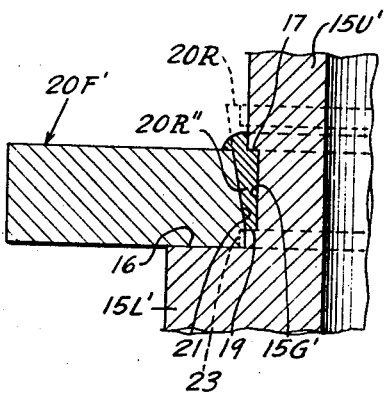
FIG. 5
FIG. 3
INVENTOR.
ADOLPH V. KLANCNIK
BY
*Wallace and Cannon*
ATTORNEYS July 17, 1956　　　　A. V. KLANCNIK　　　　2,755,112
FITTINGS Filed July 6, 1953　　　　　　　　　　　　2 Sheets-Sheet 2

INVENTOR.
ADOLPH V. KLANCNIK
BY
*Wallace and Cannon*
ATTORNEYS

United States Patent Office 2,755,112
Patented July 17, 1956

2,755,112

FITTINGS

Adolph V. Klancnik, Glenview, Ill.

Application July 6, 1953, Serial No. 366,287

8 Claims. (Cl. 285—405)

This invention relates to fittings of the type adapted to be connected to conduits, tubing, ducts and the like and in particular to flanged fittings of this type.

A common requirement in the installation of conduits, tubing, ducts and the like is to connect or mount the same to a wall, bracket or like supporting structure, and one manner in which this has been done in the past is to resort to a fitting having a flange on the periphery that is fastened thereto as by welding, soldering or some other suitable method of attachment. Such operations may require utilization of special tools and there are circumstances wherein welding or the like is objectionable or does not afford a proper connection between the fitting and the flange.

Therefore, the primary object of the present invention is to mechanically secure a flange on a fitting and thereby avoid resort to welding, soldering or brazing to secure a flange on a fitting of the above kind.

Another object is to form a groove in the periphery of a fitting in such a manner that a flange or collar may be locked therein by means of a locking ring that affords a tight mechanical lock between the parts.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

Fig. 1 is a perspective view of a fitting with an attached flange constructed and arranged in accordance with the present invention;

Fig. 2 is a sectional view taken through the fitting illustrated in Fig. 3;

Fig. 3 is an exploded view of the assembled parts shown in Fig. 1;

Fig. 4 is a detail sectional view, broken away, showing one stage in the assemblage of the aforesaid flange;

Fig. 4A is a detail sectional view, broken away, showing the completed fitting;

Fig. 5 is a detail sectional view, broken away, showing a modified form of the fitting;

Fig. 6 is a detail sectional view, broken away, showing an additional means for preventing movement of the flange relative to the fitting;

Figure 7:
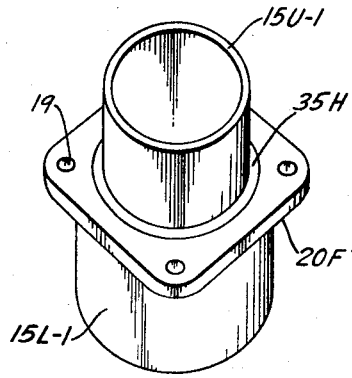
Fig. 7 is a perspective view of another flanged fitting constructed in accordance with the present invention.
Figure 8:
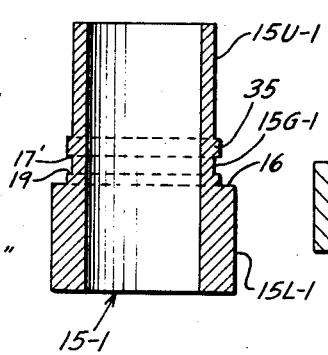
Fig. 8 is a sectional view taken through the fitting shown in Fig. 9.

For purposes of disclosure, the present invention is illustrated in Figs. 1 to 11 as embodied in a fitting 15 which includes a flange or collar 20F that is adapted to be mounted on and about the periphery of the fitting, such fitting in the present instance being illustrated as tubular in form. When the flange 20F is thus arranged on the fitting 15 as shown in Fig. 1, the fitting 15 can then be anchored to a bracket or supporting wall or other supporting member as by fasteners, not shown, inserted in openings as 19 that are provided at the four corners of the flange 20F for this purpose. Such fitting as 15 might be represented by an outlet, nipple, junction or like section forming part of a conduit or tubing that is to be anchored in place, although these and the fitting 15 itself are but illustrative forms of the present invention.

Under and in accordance with the present invention, a flange as 20F is mounted on a fitting as 15 in such a manner that the flange is locked against movement with respect thereto, and such locking arrangement is attained by means of a friction member in the form of a locking ring 20R, Fig. 3. As will be described in detail below, the ring 20R is so related to the flange 20F and the fitting 15 that during assemblage of the unit this ring is adapted to be swaged and thereby undergo cold working to such an extent as to expand between the fitting and flange and thereby frictionally lock these parts together.

Thus, as shown in the drawings the flange or collar 20F is formed with a relatively large and rounded central opening 18 therein, the wall 21 of this opening being tapered so that when the flange is assembled on the tubular fitting 15 a wedge-shaped annular cavity or space will be established about the periphery of the fitting in which may be inserted the locking ring 20R. In order that the aforementioned swaging operation may be applied to the locking ring 20R, the fitting 15 is formed with an integral abutment of one form or another which serves as an anvil against which such cold working of the locking ring 20R may take place. Thus, for purposes of description, the tubular fitting 15 is illustrated in the present instance as comprising an upper part 15U and a lower part 15L. These two opposed portions are separated by an annular groove 15G that is machined in and around the outer peripheral side of the fitting so as to have a width approximately equal to the thickness of the flange 20F. The peripheral groove 15G, as shown in Fig. 2, is defined by an upper shoulder 17, annular in form in the present instance, and an enlarged ledge 16, also annular in form, each formed integral on the fitting and the ledge 16 serves as a support piece for the flange 20F. As an example, the peripheral groove 15G may be cut to a depth of 0.01 inch and a width of 0.1 inch.

The round inner wall 21 in the flange 20F is preferably tapered at an angle of around 10°. The diameter of the narrow or lower end of the wall 21, however, is at least as large as the outside diameter of the upper part 15U of the fitting 15, this relation being best shown in Fig. 4. Hence, it will be seen that the flange 20F may be arranged with the narrow end of the wall 21 on the support ledge 16 whereupon the groove 15G in the periphery of the fitting and the tapered wall 21 in the flange 20F together define a wedge-shaped cavity or chamber that extends about the grooved portion of the fitting, and it is this wedged-shaped cavity which in accordance with the present invention serves in part to permit the flange 20F to be mechanically attached and securely fastened to the fitting 15.

To this end, the locking ring 20R is formed complementary to the aforesaid wedge-shaped chamber, but at the same time is of such size that when pressed into the aforesaid chamber it may be subjected to a cold working operation so as to expand therein against the ledge 16 as an anvil and thereby frictionally lock the flange 20F in the peripheral groove 15G of the fitting. Thus, the round exterior wall 25 of the ring 20R is inclined at an angle substantially equal to that of the wall 21 in the flange 20F, the enlarged end of the ring 20R corresponding to the enlarged end of the opening 18. Similarly, the inside diameter of the ring 20R is equal to the outside diameter of the upper part 15U of the fitting over which it is to be slipped, and it will be noted that the corresponding round inner wall 24 of the ring 20R is parallel in an axial sense to the fitting 15. However, the length of the ring 20R exceeds the width of the groove 15G, and likewise with respect to the thickness of the flange 20F, 0.015 to 0.020 inch serving as an example of this dimensional difference.

From the foregoing it will be seen that the locking ring 20R is relatively thin and small in nature, the drawings being exaggerated of course to clearly demonstrate the relations between the parts. The wide or upper end of the locking ring 20R is undercut on the inside wall 24 so as to provide an annular rabbetted groove 26 therein having a depth equal to that of the shoulder 17, and the parts are preferably so dimensioned that when the locking ring 20R is slipped down into the annular wedge-shaped chamber established between the flange 20F and the peripheral groove 15G, the narrow end of the ring 20R just fails to rest on the ledge 16. Under such circumstances, the groove 26 at the thick end of the ring 20R is displaced somewhat above the shoulder 17 which extends around the top edge of the groove 15G (see Fig. 10A). Now, by swaging or upsetting the ring 20R within the chamber, the same will expand and will be driven further down into the aforesaid chamber at the same time. The swaged or upset locking ring, 20R', Fig. 4A, now has a rounded head 25H and the groove 26 thereof has been interlocked with the shoulder 17, expanding against the opposed walls 21 of the flange 20F and the groove 15G, Fig. 4A.

From the foregoing it will be seen that the fitting as thus afforded has non-rotatably fastened thereto a flanged collar. The upsetting operation performed on the locking ring 20R as the latter is pressed against the ledge 16 as an anvil, and into a tight fit between the flange 20F and the tubular fitting locks these parts together, and this locking arrangement is sufficiently tight in each and every instance to prevent the flange from turning relatively or moving axially along the fitting, especially in view of the interfit between the rabbetted groove 26 and the shoulder 17.

As shown in Figs. 5 and 6, such lack of movement by the flange can be further assured by forming a flange as 20F' to include serrations or locking teeth 23 at the lower end of the inner wall 21 bordering the opening 18 therein. Thus, in this instance, a groove 15G' having less width than the thickness of the flange 20F' is cut in the periphery of the fitting between the upper and lower parts 15U' and 15L' thereof, and this groove is defined at the lower edge by a lower annular shoulder 19 that is spaced below the upper annular shoulder 17 and above the ledge 16, these elements of course being integral with the fitting itself. The diameter of the shoulder 19, however, is of such size that a press fit will be established between the vertical wall thereof and the teeth 23 in the flange opening 18 when the corresponding flange 20F' is pressed down on to the ledge 16. Thus, as shown in Fig. 5, the serrations 23 formed in the flange 20F' are adapted to encircle and bite into the outside vertical wall of the shoulder 19.

When the locking ring 20R is first slipped into the wedge-shaped space that lies between the flange 20F' and the groove 15G' in the fitting, a substantial part thereof projects above this space as indicated in Fig. 5 so that the swaged ring 20R'' that is subsequently formed from the ring 20R is somewhat thicker than the resulting swaged ring 20R' described above. Accordingly, it will be clear that when the locking ring 20R is upset on the shoulder or ledge 19 serving as an anvil and thereby increased in cross section within the wedge-shaped chamber that is closed off by the lower shoulder 19, the metal comprising the locking ring 20R will expand against the opposed walls of the peripheral groove 15G' and the flange 20F' and thereby lock the parts together.

In the form of the invention shown in Figs. 7 to 10B, the anchoring flange is adapted to be fastened to a fitting 15–1 that is constructed and arranged to be swaged itself; and therefore in this form of the invention two swaging operations are performed, one on the locking ring 20R and the second on a sealing member in the form of a ring 35 formed integrally on the fitting as 15–1 to which the flange is to be attached. Again, the fitting as 15–1 to which the fitting is to be attached is tubular in form and can be looked upon as comprising upper and lower portions, in this instance 15U–1 and 15L–1.

Figure 10:
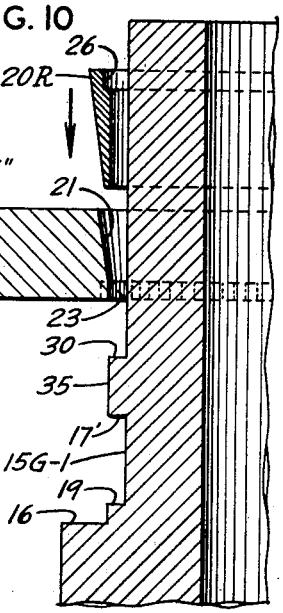
Fig. 10 is a detail sectional view, broken away, illustrating one stage in the assemblage of the fitting shown in Fig. 7.
Figure 9:
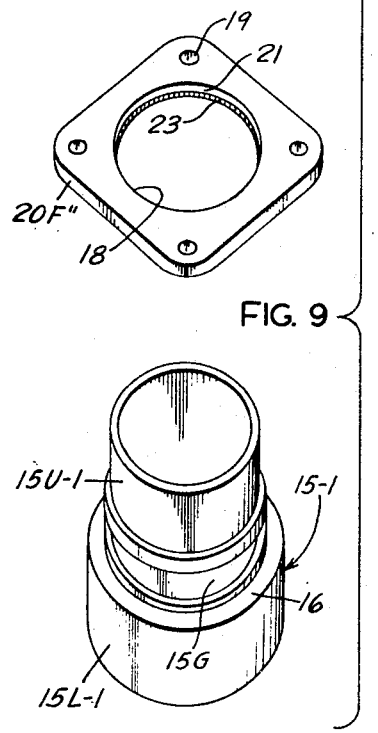
Fig. 9 is an exploded view of the assembled parts shown in Fig. 7.
Figure 11:
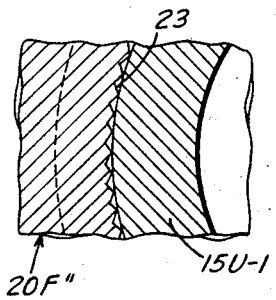
Fig. 11 is a sectional view taken on the line 11—11 of Fig. 10B.

As shown in Figs. 9 and 10, the locking ring 20R in this form of the invention is identical to the locking ring considered hereinabove in connection with Figs. 1 to 6, including the rounded inner wall 24, the tapered outer wall 25, and the groove 26 formed in the inner wall at the thick end. Similarly, that portion of the fitting 15–1 which is to receive and mount the anchoring flange includes a peripheral groove 15G–1 that is defined at the lower edge by a shoulder 19, annular in form, and at the upper edge by another shoulder 17' that is annular in form, the latter being represented in this instance by the bottom wall of the annular sealing ring 35 that is formed integrally on the outer wall of the fitting.

Figure 10A:
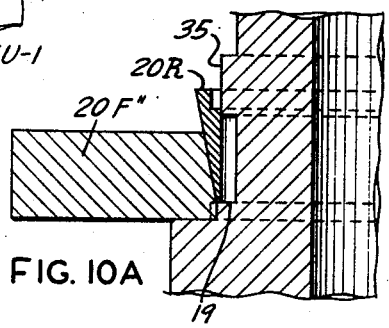
Fig. 10A is a detail sectional view, broken away, showing an intermediate stage in the assembly of the fitting illustrated in Fig. 7.

The flange, in this instance 20F'', has a thickness such that when the flange 20F'' is slipped down over the upper portion of the fitting 15–1 and rested on the support ledge 16, the top side thereof will be spaced substantially below the shoulder 17' as shown in Fig. 10A. The flange 20F'' is also serrated at the lower end as viewed in the drawings to provide locking teeth 23 adapted for a press fit with the shoulder member 19 as described in detail hereinabove. After the locking ring 20R is inserted in the annular cavity established between the flange 20F'' and the fitting 15–1, the same is then swaged against the shoulder 19 as an anvil, and this results in the formation of an expanded and upset friction ring 20R''' located within a corresponding wedge-shaped cavity and underneath the sealing ring 35. This is effective to lock the flanged fitting 20F'' to the fitting.

Figure 10B:
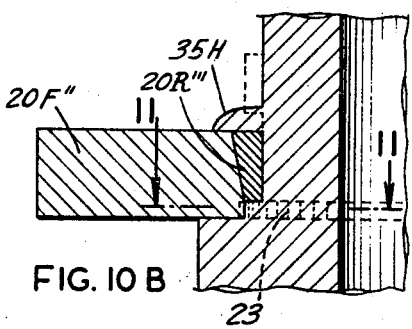
Fig. 10B is a detail sectional view, broken away, of the completed fitting illustrated in Fig. 7.

Following the formation of the friction ring 20R''', the sealing ring 35 is then swaged, and this produces a relatively flat and enlarged head 35H, Fig. 10B, that surrounds and seals the top of the locked ring 20R'''.

From the foregoing it will be seen that the present invention provides for a quick and ready means to assemble a fitting on a member, and in each instance this is an expeditious mechanical operation that does not depend upon a welded, soldered or similar type joint.

I claim:

1. A flanged fitting for a tube, duct or the like member comprising a tubular member formed with a groove on the outside wall thereof affording a shoulder and a ledge spaced axially from one another, a flange adapted to seat on said ledge and having an opening therein adapted to fit around said groove formed in the outside wall of the tubular member, the wall of said opening being tapered to define, with the opposing wall of said tubular member, an annular wedge-shaped chamber extending around the corresponding peripheral portion of said tubular member, and a wedge-shaped locking ring formed complementary to said chamber to fit therein, said ring being of a size to be upset in said chamber to expand therein between and against said shoulder and ledge to thereby frictionally lock the flange to the tubular member.

2. A fitting comprising, a tubular member, a collar having a tapered opening located centrally therein of greater dimension than the peripheral wall of the tubular member and about which the collar is mounted, an abutment extended outwardly of the peripheral wall on said tubular member and about which said collar is disposed with the corresponding end of the opening therein closed off by said abutment, a second abutment extended outwardly of the peripheral wall of said member above the first-named abutment, and a locking ring wedged into the space between said member and the opening in said collar and expanded in said space tightly with opposite ends of said ring engaged by said abutments.

3. A flanged fitting for a tube, conduit or the like comprising, a tubular member, a flange-like collar having a circular opening located medially therein larger than the outside diameter of said tubular member and which is adapted to be mounted concentrically on and about a corresponding part of said tubular member, a wedge-shaped locking ring adapted to be wedged into the space between said part of said tubular member and the opening in said collar, a shoulder integrally formed on said tubular member to close off one end of said space and against which one end of said locking ring may be tightly expanded, and a second shoulder integrally formed on said tubular member in spaced relation to the first-named shoulder and by which the other end of said locking ring may be engaged when expanded to lock said collar against movement.

4. In a fitting, a tubular member, said tubular member being formed with an annular groove in the outer wall thereof, said groove having opposed axially spaced end walls, a collar mounted on said tubular member and formed with a tapered opening therein disposed in spaced concentric relation about said annular groove, a ledge on said tubular member supporting said collar so that the opening therein is extended about said groove as aforesaid, and a thin-walled swageable ring pressed into the space between said collar and said groove and expanded therein so that opposite ends thereof respectively engage said end walls of said groove to lock the collar in place on and about said tubular member, the outer wall of said ring being tapered complementary to the tapered opening in said collar.

5. A fitting according to claim 4 in which one end of said ring corresponding to one of the two end walls of said groove is formed with a rabbetted groove about the inner wall thereof to interfit with such corresponding end wall when said ring is expanded.

6. In a fitting, a tubular member having a groove formed in the outer wall thereof so as to have opposed axially spaced end walls, a collar having an opening therein larger than and extended about said groove formed in the tubular member, a ledge formed on said tubular member and being larger than said opening and on which said collar is rested, the wall of the opening in said collar being tapered to define, with the opposing wall of said groove, a wedge-shaped chamber extending about the corresponding portion of said tubular member, and a wedge-shaped swageable locking ring formed complementary to said wedge-shaped chamber and wedged tightly therein so that the opposite ends of said ring engage said opposed end walls of said groove whereby said collar is locked on said tubular member against displacement in either axial direction.

7. A fitting as set forth in claim 6 in which the wall of the locking ring at the larger-diametered end thereof is rabbetted to interfit with the corresponding end wall of said groove.

8. A fitting for a conduit or the like comprising, a tubular member formed with a groove in the outer wall thereof affording a pair of opposed axially spaced apart end walls, a ledge on said tubular member, a collar having a wedge-shaped opening therein and mounted on said ledge so that the opening therein extends about the groove in said tubular member in spaced concentric relation thereto, a swageable wedge-shaped locking ring arranged in the space thus afforded between said groove and the opening in said collar and expanded therein so that opposite ends of the ring engage said end walls of the groove formed opposedly on said tubular member while the sides of the ring are expanded radially against the opposed sides afforded by said groove and the opening in said collar.

References Cited in the file of this patent

UNITED STATES PATENTS

| | | |
|---|---|---|
| 1,461,482 | Hahn | July 10, 1923 |
| 1,666,076 | Ufer | Apr. 17, 1928 |
| 2,038,124 | Osborne | Apr. 21, 1936 |
| 2,461,337 | Miskimen | Feb. 8, 1949 |